United States Patent
Karri et al.

(10) Patent No.: US 12,020,204 B2
(45) Date of Patent: Jun. 25, 2024

(54) SCALABILITY OF PHYSICAL STORAGE SPACES

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 17/539,495

(22) Filed: Dec. 1, 2021

(65) Prior Publication Data

US 2023/0169453 A1    Jun. 1, 2023

(51) Int. Cl.
*G06Q 10/087* (2023.01)
*G06Q 20/20* (2012.01)

(52) U.S. Cl.
CPC .................. *G06Q 10/087* (2013.01)

(58) Field of Classification Search
CPC ... G06Q 10/087; G06F 3/0604; G06F 3/0614; G06F 3/0629; G06F 21/602
USPC .......................................................... 705/28
See application file for complete search history.

(56) References Cited

U.S. PATENT DOCUMENTS

| | | | |
|---|---|---|---|
| 2018/0158020 A1 | 6/2018 | Khasis | |
| 2019/0062055 A1* | 2/2019 | Hance | G01C 21/3407 |
| 2021/0047119 A1* | 2/2021 | Lisso | G06Q 10/08 |
| 2023/0109690 A1* | 4/2023 | Mutha | G06F 9/5083 718/1 |

FOREIGN PATENT DOCUMENTS

| | | |
|---|---|---|
| CN | 116204114 A | 6/2023 |
| JP | 2023081840 A | 6/2023 |

OTHER PUBLICATIONS

"AI Enabled Ameliorative Analysis for Dynamic On-Demand Warehousing with Customer Locations", An IP.com Prior Art Database Technical Disclosure, Authors et. al.: Disclosed Anonymously, IP.com No. IPCOM000265734Dn IP.com Electronic Publication Date: May 11, 2021, 6 pages.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Garcia Ade
(74) *Attorney, Agent, or Firm* — Daniel J Blabolil

(57) ABSTRACT

A processor may receive storage space information associated with an agile storage space. In some embodiments, the agile storage space may include one or more smart storage spaces. A processor may analyze the storage space information associated with the agile storage space. A processor may determine if an amount of one or more objects exceeds a storage threshold. In some embodiments, the amount of the one or more objects is based, at least in part, on the storage space information. A processor may assign the one or more objects to the one or more smart storage spaces. In some embodiments, assigning the one or more objects to the one or more smart storage spaces may be based, at least in part, on the storage threshold and the storage space information.

20 Claims, 5 Drawing Sheets

SCALABILITY OF PHYSICAL STORAGE SPACES

BACKGROUND

The present disclosure relates generally to the field of storage spaces, and more particularly to the field of optimizing storage spaces.

Online shopping has become a popular method of shopping that allows for people to easily purchase goods without having to travel to a physical location. As many industries switch to providing goods online, there has been an increase in competition between companies regarding who can provide the customer with the fastest delivery. As such, companies are often looking for delivery systems that offer faster product delivery of products to the customer's location.

SUMMARY

Embodiments of the present disclosure include a method, computer program product, and system for managing an agile storage space. A processor may receive storage space information associated with an agile storage space. In some embodiments, the agile storage space may include one or more smart storage spaces. A processor may analyze the storage space information associated with the agile storage space. A processor may determine if an amount of one or more objects exceeds a storage threshold. In some embodiments, the amount of the one or more objects is based, at least in part, on the storage space information. A processor may assign the one or more objects to the one or more smart storage spaces. In some embodiments, assigning the one or more objects to the one or more smart storage spaces may be based, at least in part, on the storage threshold and the storage space information.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
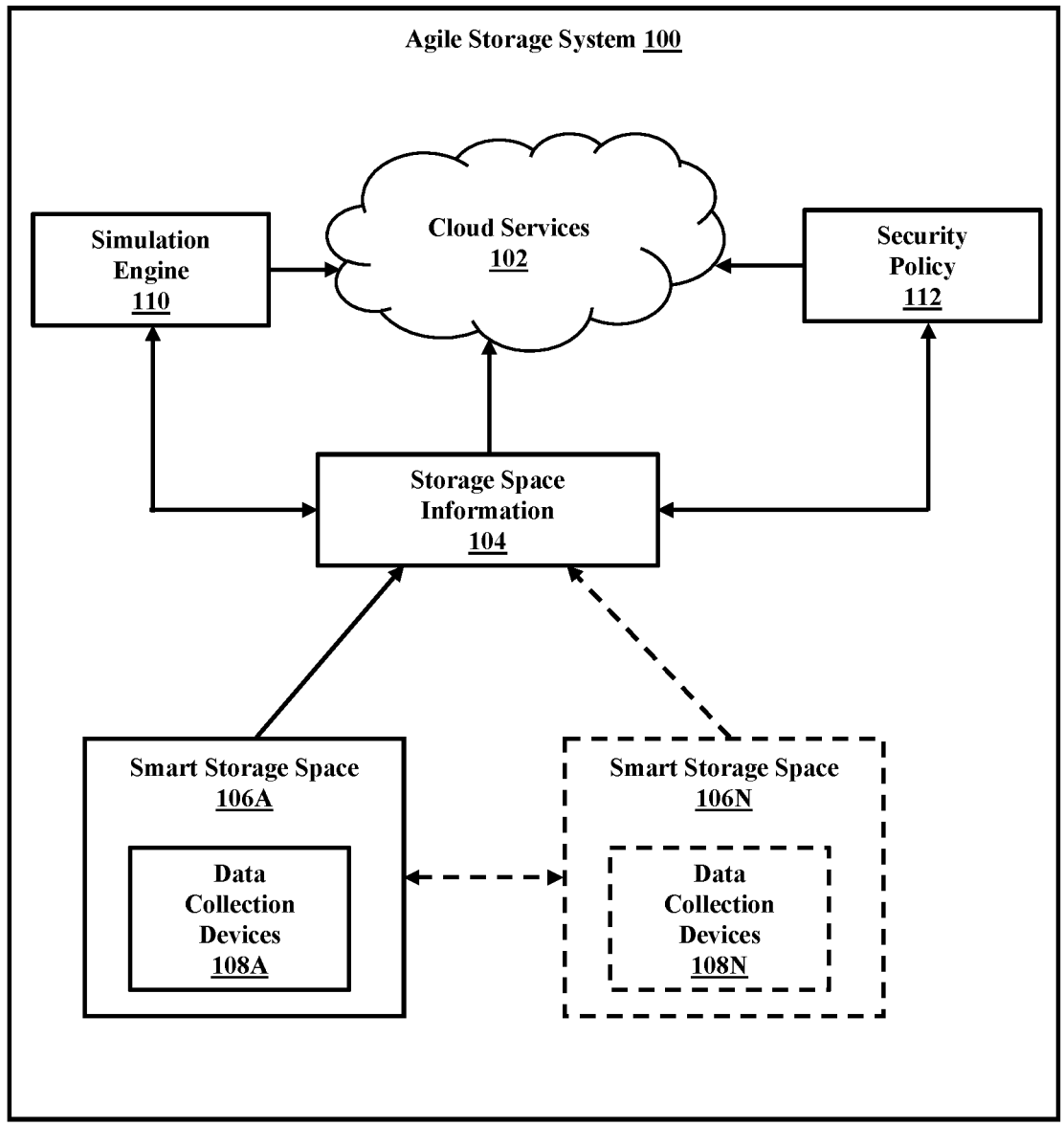
FIG. 1 depicts a block diagram of an embodiment of agile storage space management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of storage spaces, and more particularly to the field of optimizing storage spaces. While the present disclosure is not necessarily limited to such applications, various aspects of the disclosure may be appreciated through a discussion of several examples using this context.

Despite businesses making a move from retail based stores to providing customers with a more accommodating online shopping experience, the ability for businesses to store their goods and products is still an important consideration to ensure customers can receive their purchases in a timely manner. Such businesses have to consider not only the location of the storage space, but also ensure the storage space is large enough to accommodate times of high product demand. By ensuring the storage space is large enough during such times, a business can maximize their profits by providing products to all of the customers who wish to purchase a product. Unfortunately, when there is low product supply or low product demand product, such storage spaces are underutilized and of no use to the business until demand or product supply increases. Such storage spaces are often expensive for businesses to maintain and if not properly utilized can lead to a strain on the business' profits. As such, there is a desire to optimize such storage spaces as well as other types of storage areas that allows businesses to access the optimal amount of storage to accommodate their products.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., agile storage space management system 100).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing an agile storage space. Embodiments contemplated herein may enable a user (e.g., business owner, administrator, etc.) to optimize the storage of one or more objects (e.g., products) by scaling the agile storage space up and/or down to accommodate a business' storage space needs.

In traditional storage spaces, a business (e.g., user) would ideally choose a storage space that is located near the location of their customers, such as a city or town. By locating the storage space near customers, a business could reduce not only the time associated with delivering the product to the customer but also the cost of transporting the product to the customer. Unfortunately, in some situations, storage spaces may be limited or inaccessible to some businesses. In some city locations, a small business may not be able to find a storage space that is optimal for their needs. For example, a small business may need a small storage space, such as a storage shed, to accommodate their product demand, but only large storage spaces, such as large warehouses, are available. Such a storage space, even were the small business were able to afford it, would not be efficient or optimal for the small business and would likely result in a significant cost to the small business.

Alternatively, a large business may be unable to locate a large storage space to store their large number of products. If businesses are unable to store their objects near or within the city, they risk not only increasing the delivery times, but also the cost of delivery. Accordingly, embodiments contemplated herein allow for the management of agile storage spaces. In these embodiments, agile storage spaces may be configured in such a way as to allow users or businesses to scale storage spaces to accommodate each particular user's storage needs. Such embodiments may ensure that the associated storage spaces are efficiently used in a manner that is optimal to the user's/business' needs.

In embodiments, an agile storage space may include one or more smart storage spaces. A smart storage space may include, but is not limited to any warehouse, storage shed, retail store, rooftop of any building, office area, parking lot, closet, shelf, portion of a shelf, or any combination thereof. While in some embodiments, an agile storage space may be controlled by a single entity (e.g., user) that owns and/or controls each of the one or more smart storage spaces included in the agile storage space, in other embodiments, an agile storage space may include smart storage spaces that are owned/controlled by multiple entities or users.

For example, in one embodiment an agile storage space may include three smart storage spaces owned/controlled by different users (e.g., business owners). These smart storage spaces may include Business A who owns or leases a small storage shed to store inventory for her retail store, Business B who owns a large warehouse, and Business C who has a storage room associated with their retail store. In this example, each of the three business owners could agree to metaphorically join each smart storage space together to form an agile storage space. By joining their separate smart storage spaces to form an agile storage space, each of the business owners may utilize any portion of the smart storage space they may need.

Continuing the above example, during times of low demand Business B's warehouse may be empty. When Business B's warehouse is empty the smart storage space is underutilized and may result in a significant cost to Business B to maintain the warehouse. However, when Business B joins his smart storage space to Business A's and Business C's smart storage spaces to form an agile storage space, this allows Business A and Business C to store any products or goods (e.g., one or more objects) that they may want to store in Business B's warehouse. This would result in Business A and Business C being able to scale up their available storage space to accommodate the volume of their respective products during high demand and for Business B to utilize the warehouse and scale down their available storage space. In some embodiments, as will be discussed in more detail later, Business B may be compensated for the products, or objects Business A and Business C store within the warehouse. While aforementioned example of an agile storage space is simplistic, any number of users (e.g., business) may collectively join their smart storage spaces to form an agile storage space that can be configured to scale up or scale down each respective user's smart storage space.

In embodiments, a smart storage space may include any number or combination of one or more data collection devices. The one or more data collection devices may include, but are not limited to Internet of Things (IoT) devices, cameras, ultrasounds, devices configured to detect one or more biological parameters, or any combination thereof.

In embodiments, a processor may be configured to receive/collect storage space information associated with each of the one or more smart storage spaces of an agile storage space. A processor may receive/collect storage space information using one or more data collection devices. Data collection devices may be configured by a processor to collect storage space information in real-time and/or to collect storage space information over time. In these embodiments, a processor may store the collected/received storage space information in a historical repository.

Storage space information may include any data or information associated with the smart storage space(s). Examples of data associated with storage space information may include, but are not limited to: i) the configuration of the smart storage space (e.g., open area, shelving, storage compartments, etc.) ii) the dimensions of the smart storage space, iii) what objects may be currently occupying the smart storage space, iv) amount of space available for storage of objects (e.g., space not already occupied by other objects), v) properties (e.g., object parameters) of the objects stored currently associated with the smart storage space, iv) location of each smart storage space in the agile storage space, iiv) security policies (e.g., physical and digital security policies), and/or any information/data generated from various analysis contemplated herein (e.g., data generated from machine learning techniques). In some embodiments, a processor may receive storage space information from one or more databases. For example, in some embodiments, a processor could receive information from a particular database about the configurations of specific smart storage spaces associated with a particular structure (e.g., particular warehouse). In embodiments, storage space information may be stored in a cloud hosted server.

In embodiments, a processor may be configured to analyze the storage space information associated with the smart storage space. In these embodiments, a processor may use artificial intelligence (AI) and machine learning techniques to analyze the storage space information stored in the historical repository as well as real-time data collected from the one or more data collection devices associated with the smart storage space. In embodiments, a processor could collect a variety of storage space information from various sources. For example, a processor could receive and analyze the blueprints associated with a particular warehouse (e.g., from an external database) and determine (e.g., using AI and machine learning techniques) they type of available storage spaces, the spatial dimensions of any available storage space, as well as where each available storage space is located within the warehouse. Continuing the example, a processor could collect/receive real-time storage space information that, after analysis, may indicate if there are any objects (e.g., products) occupying the smart storage space and what those objects may be. For example, a processor could determine, using storage space information (e.g., via one or more data collection devices), that the objects currently occupying the smart storage space are medical supplies and that the medical supplies are occupying a quarter of the available storage space. In some embodiments, a processor may also analyze the storage space information and associated smart storage space for one or more environmental features. An environmental features of a smart storage space may include, but is not limited to, temperature controlled areas (e.g., refrigerated containers) and humidity controlled areas (e.g., for document storage).

While in some embodiments, a processor may continuously update the cloud hosted server with updated storage space information (e.g., regarding what space is available in a particular smart storage space), in other embodiments, a processor may receive storage space information from a user. In either embodiment, any updated storage space information may be published to the cloud hosted server and visible to each user of the agile storage space. For example, a user may provide updated storage space information regarding that a particular smart storage space has been reconfigured to provide temperature controlled areas and that the temperature controlled areas are now available to store one or more objects.

In some embodiments, a processor may analyze the one or more objects and determine one or more object parameters associated with a particular object. An object parameter may include any property or feature of the object including, but not limited to, the shape object, the dimensions of the object (e.g., dimensions of regular/irregular shaped objects), the weight of the object, the hardness or softness of the object, the material(s) the object is composed of, the color of the object, or any combination thereof. In embodiments, a processor my determine or identify any number of object parameters associated with a particular object. Continuing the above example embodiment, a processor could analyze the medical supplies currently occupying the smart storage space and determine the object parameters of each medical supply (e.g., packaged medical supplies). In this example embodiment, a processor could determine a particular medical supply has a particular shape, the dimensions of the particular medical supply, the hardness of the medical supply packaging, and the level of fragility as it pertains to the packaging and/or the particular medical supply itself (e.g., if the medical supply is made of glass). In embodiments, object parameters and associated data may be stored as storage space information.

In embodiments, a processor may analyze these object parameters to determine if the one or more objects have one or more environmental condition requirements. For example, continuing the above example, some medical supplies may be required to be refrigerated or kept at constant temperatures. In embodiments, a processor may analyze the storage space information associated with different smart storage spaces to identify if a particular smart storage space has the appropriate environmental features (e.g., a refrigerated storage space) to maintain objects that require particular storage environments.

In embodiments, a processor may determine if an amount of one or more objects exceeds a storage threshold. An amount may refer to any unit of measurement that may be used when determining if the storage threshold has been exceeded. As contemplated herein, each smart storage space within the agile storage space may have its own set of attributes that may make one smart storage space a more suitable storage space than another smart storage space. These attributes may include, but are not limited to, differences in total available space (e.g., a warehouse versus a storage shed), differences in maximum weight allowances or weight distribution (e.g., simple shelving versus reinforced shelving), differences in environmental features (e.g., temperature control versus exposure to the elements), different configurations of storage structures (e.g., warehouse with specific shelving structure versus a warehouse having an open floor plan), and differences in security policies (e.g., levels of physical and digital security). In embodiments, a processor may determine these sets of attributes by analyzing storage space information. A processor may then determine a storage threshold for each of the one or more smart storage spaces. A storage threshold refers to when one or more smart storage space attributes reaches and/or exceeds the maximum or limit for the particular storage space. In one example embodiment, a smart storage space may include a reinforced shelf capable of holding a total of 200 lbs with a total storage volume of 81 cubic meters (e.g., attributes). In such embodiments, a processor may determine the storage threshold can be reached or exceeded in multiple situations. For example, continuing the above example embodiment, a processor may determine the storage threshold is exceeded for the smart storage space when either the total weight of the one or more objects on the reinforced shelf would exceed 200 lbs, or when the total storage volume of the one or more objects would exceed the 81 cubic meters.

In embodiments, a processor may use storage space information to determine which of the one or more smart storage spaces of the agile storage space should be used to store one or more objects. While the processor may base this determination at least in part on the storage threshold of each of the one or more smart storage spaces, in other embodiments, the processor may also base this determination on one or more user inputs. These user inputs may include, but are not limited to, having all of the objects they intend to store stored within one smart storage space (e.g., allows a user to easily access their one or more objects), having the objects stored near a particular location (e.g., near a particular city or community where demand for the object may be high), and particular security policies (e.g., levels of physical and digital security). In one example embodiment, a processor may receive a user input indicating that they would like to store their products (e.g., one or more objects) near their retail shop in the city to ensure when demand for the objects is high, the user's customers may be able to receive the product within a timely manner without the significant cost of transporting the product from longer distances.

In embodiments, a processor may assign one or more objects to the one or more smart storage spaces. Assigning the one or more objects may be based, at least in part, on the storage threshold and the storage space information. In some embodiment, a processor may also consider a user's input to assign the one or more objects to one or more smart storage spaces. In embodiments, a processor may receive storage space information indicating that a user would like to store one or more objects in the agile storage space. In embodiments, a processor may further analyze the one or more objects and the smart storage space by generating one or more simulations. In some embodiments, a processor may use the various information associated with storage space information and historical storage space information from the historical repository to produce a digital twin of the various objects currently stored in the agile storage space (e.g., one or more smart storage spaces). A processor may use such digital twins to generate simulations associated with how the additional one or more objects (e.g., user's one or more objects they want to store) may be stored within the agile storage space. In these embodiments, a processor may utilize AI and machine learning techniques to generate and simulate the digital twin. Using such simulations and techniques, a processor may assign the one or more objects to the one or more smart storage spaces.

In some embodiments, a processor may generate one or more simulations to predict a level of demand regarding a user's one or more objects. For example, a processor may use historical storage space information as well as storage space information (e.g., historical storage space information from a historical repository) that may be used to simulate different trends within different populations based on their geographical location. For example, a processor may analyze and identify that for the past three years a particular object (e.g., Christmas lights) was stored in high amounts for a short duration of time (e.g., Christmas season). As such, the processor could inform a user of this trend and indicate demand for such objects may be high during this particular time. While this is a simplified example, a processor may be able to forecast/predict other demands based on events such as weather forecasts, community social events and the like.

In embodiments, a processor may simulate the one or more objects a user wants to store and determine the amount of the one or more objects does not exceed the storage threshold associated with a particular smart storage space, or primary storage space, of the agile storage space. In these embodiments, a processor may assign the user's one or more objects to the primary storage space (e.g., one of the one or more smart storage spaces).

In embodiments, where a processor determines the amount of the one or more objects exceeds a storage threshold of a particular smart storage space, or primary storage space, a processor may identify another smart storage space, or secondary storage space, where the user's one or more objects do not exceed the storage threshold (e.g., the storage threshold associated with the secondary storage space). The processor may then assign the user's one or more objects to the secondary storage space (e.g., one of the one or more smart storage spaces).

In some embodiments, while determining the amount of the one or more objects exceeds a storage threshold of a smart storage space, a processor may determine a capacity amount and an overload amount. A capacity amount may refer to a first subset of the user's one or more objects, or the amount (e.g., weight, volume, are etc.) of the user's one or more object that may be stored within the particular storage space without exceeding storage threshold. An overload amount may refer to a second subset of the user's one or more objects, or the amount (e.g., weight, volume, area etc.) the user's one or more objects exceed (e.g., determined using simulations) the storage threshold of the particular smart storage space. The capacity amount may vary depending what objects are currently occupying the particular smart storage space. For example, in one example embodiments, User A may currently store 50 cubic meters of Product X in a primary smart storage space that has a storage threshold of 90 cubic meters and User B may want to store 50 cubic meters of Product Y. In such embodiments, a processor may assign the capacity amount to a particular smart storage space, or primary storage space, and the overload amount may be assigned to a different smart storage space, or secondary storage space. This may be considered scaling up User B's storage space. Continuing the above example, a processor could analyze the 50 cubic meters of Product Y and the 90 cubic meter storage threshold associated with the primary storage space and determine a capacity amount of 40 cubic meters and an overload amount of 10 cubic meters. In such embodiments, a processor may assign the capacity amount to a primary storage space (e.g., to a smart storage space where the amount of objects does not exceed the storage threshold) and may assign the overload amount to a secondary storage space (e.g., other smart storage space). In some embodiments, a processor may receive storage space information that indicates that 90 cubic meters of Product Y cannot be separated (e.g., user input that all objects remain together, or Product Y is a single object). In such embodiments, a processor may assign Product Y to be stored in another smart storage space (e.g., a tertiary storage space) where all 90 cubic meters of the object may be stored without exceeding the storage threshold associated with that particular smart storage space.

In some embodiments, a processor may determine a particular cost associated with the one or more smart storage spaces within the agile storage space. The processor may generate the cost based on a variety of factors including, but not limited to, location of the smart storage space, the amount of space the user's one or more objects are occupying, special considerations associated with the one or more objects (e.g., the objects need to be refrigerated), duration the objects are stored in the particular smart storage space, etc. Continuing the above example, a processor may generate a cost for User B that includes the cost of storing Product Y in the primary storage space and the secondary storage space.

In embodiments, a user may decide to remove their one or more objects from one of the one or more smart storage spaces. In some embodiments, a processor may receive storage space information from the one or more data collection devices and identify that the user's one or more objects are being removed form one or more smart storage spaces. In such embodiments, a processor may unassign the one or smart storage spaces that no longer containing a user's one or more objects. This may be considered scaling down the user's agile storage space. The now unassigned smart storage space may then be made available to other users within the agile storage space. In embodiments where a processor generates a cost for the user storing objects in the agile storage space, when a processor determines that a user is no longer using a smart storage space (e.g., scaled down storage space), a processor may remove the cost associated with the smart storage space no longer used.

In embodiments, a processor may include a security policy. While in some embodiments a security policy may be associated with all of the one or more smart storage spaces associated with the agile workspace, in other embodiments, some or all of smart storage spaces included in the agile storage space may include a specific security policies associated with a particular smart storage space location. A security policy may include rules and regulations associated with physical and/or digital security. Such rules and regulations aim to not only secure the varied products within the agile storage space but to also maintain trust between users of the agile storage space. In some embodiments, a processor may configure a security policy using various information such as, historical storage space information (e.g., stored in the historical repository) and user input (e.g., user defines what level of digital security would be appropriate).

In some embodiments, a security policy may require each party (e.g., user, delivery person, delivery vehicle, etc.) accessing the agile storage space to have a security key. In these embodiments, a processor may assign each party a unique security key that allows parties having valid authorization to only enter the particular smart storage space of the agile storage space while preventing parties who do not have valid authorization from entering and/or accessing the particular storage space. For example, delivery vehicles may be used to transport the one or more objects from a first smart storage space to a second smart storage space within the agile storage space. In this example, a delivery vehicle and/or delivery people may be issued a unique security key that allows them to access the first smart storage space to retrieve the various objects they intend to transport. In some embodiments, a processor may receive storage space information from the one or more data collection devices within the first smart storage space and determine that the intended objects have been retrieved by the delivery vehicle/delivery people. In this embodiment, once the delivery vehicle has left the first smart storage space and no longer require access to the first smart storage space, a processor may revoke the delivery vehicle's security key and prevent the delivery vehicle from accessing the first smart storage space without valid authorization. In other embodiments, a processor may provide the delivery vehicle with a security key that enables the delivery vehicle to enter the second smart storage space to deliver the intended objects. In these embodiments, a processor may track what objects (e.g., products, merchandise, etc.) that has been removed from the particular storage space. Such embodiments may ensure that no objects are lost by the comingling of objects associated with different users. In addition, delivery vehicles/delivery people are prevented from taking or adding unauthorized objects to the storage space without proper authorization.

A processor may analyze the storage space information as well as historical space information stored in a historical repository to determine if users and/or a particular smart storage space within the agile storage space has a valid compliance level. In embodiments, an valid compliance level is maintained when the one or more smart storage spaces correctly reflect the rules and regulations established in the security policy. For example, if a security policy indicates that the smart storage space prevents unauthorized users from accessing the smart storage space by requiring authorized users to provide a security key before entering the smart storage space, a processor may analyze storage space information and authenticate using historical storage space information that only users having proper authorization have been granted entrance to the smart storage space. Other examples include, but are not limited to, ensuring proper digital security measures are maintained (e.g., cybersecurity regulations), ensuring temperature controlled areas within the smart space are controlled to provide the correct temperature ranges (e.g., effectiveness of cooling and/or heating mechanisms), and ensuring other physical security measure are maintained (e.g., having regular personnel who maintain the security of the smart storage space, ensuring the one or more objects are treated according to the security policy (e.g., fragile objects should be properly secured within smart storage space).

Referring now to FIG. 1, a block diagram of navigation management system 100 for managing an agile storage space is depicted, in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, agile storage system 100 may include cloud services 102, storage space information 104, one or more smart storage spaces 106 (e.g., depicted as smart storage spaces 106A-N), simulation engine 110, and security policy 112. In embodiments, a user may interact with agile storage system 100 by accessing cloud service 102. A user may use agile storage system 100 to scale up or scale down their agile smart storage space based on the amount of the one or more objects the user would like to store. In embodiments, agile storage system 100 may be configured to receive storage space information associated with an agile storage space. In embodiments, an agile storage space may include one or more smart storage spaces 106A-N. Each of the one or more smart storage spaces 106A-N may include one or more data collection devices 108A-N that may be used to collect storage space information associated with the particular smart storage space. For example, data collection devices 108A-N may collect the storage dimensions and amount of objects that are currently occupying the particular smart storage space. In embodiments, agile storage system 100 may analyze (e.g., using AI and machine learning techniques) the storage space information associated with each of the one or more smart storage spaces 106A-N of the agile storage space.

In embodiments, agile storage system 100 may be configured to determine whether an amount of one or more objects exceeds a storage threshold. In some embodiments, the amount (e.g., weight, size, dimensions, etc.) of the one or more objects may be based, at least in part, on the storage space information. Based on whether the storage threshold is exceeded or not exceeded, agile storage system 100 may assign the one or more objects to one or more smart storage spaces. In embodiments where the amount of one or more objects does not exceed a threshold amount, agile storage system 100 may assign the one or more objects to one or the one or more smart storage spaces 106A-N, or a primary storage space. In embodiments where an amount exceeds a storage threshold, the agile storage space may be scaled up by allowing the user to store their objects in more than one smart storage space. For example, where an amount of one or more objects exceeds a storage threshold (e.g., for a particular smart storage space 106A), agile storage system 100 may assign some of a user's objects to a primary storage space (e.g., one of the one or more storage spaces 106A-N) and the other objects to a secondary or tertiary storage space (e.g., other smart storage spaces 106A-N). In embodiments where the user no longer has an amount, such as an overload amount, of objects that require storing, the user may scale down their agile storage space and to only use the smart storage spaces needed to store the remaining amount of objects. For example, if agile storage system 100 initially assigned a user's one or more objects to a primary storage space and a secondary storage space and the user decides to remove the one or more objects stored in the secondary storage space, agile storage system 100 will scale down the user's storage space to only include the primary storage space and the secondary storage space may be opened for another user's one or more objects.

Figure 2:
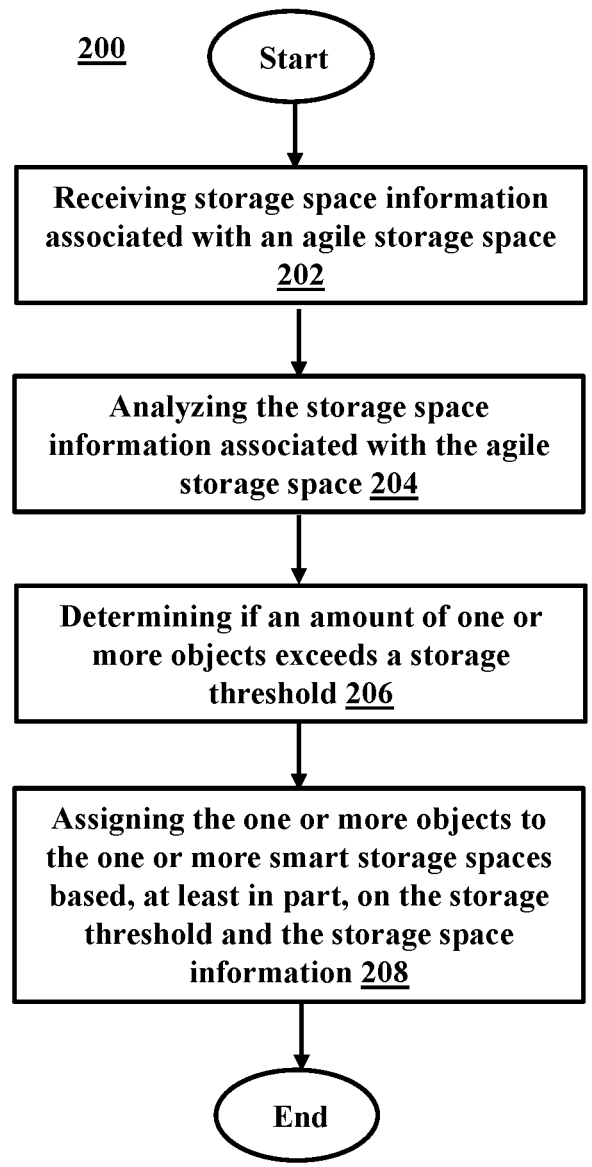
FIG. 2 illustrates a flowchart of a method for managing an agile storage space, in accordance with embodiments of the present disclosure.

Referring now to FIG. 2, a flowchart illustrating an example method 200 for managing an agile storage space, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive storage space information associated with an agile storage space. In embodiments, the agile storage space may include one or more smart storage spaces. In some embodiments, the method 200 proceeds to operation 204.

At operation 204, a processor may analyze the storage space information associated with the agile storage space. In some embodiments, the method 200 proceeds to operation 206.

At operation 206, a processor may determine if a amount of one or more objects exceeds a storage threshold. In embodiments, the amount of the one or more objects may be based, at least in part, on the storage space information. In some embodiments, the method 200 proceeds to operation 208.

At operation 208, a processor may assign the one or more objects to the one or more smart storage spaces based, at least in part, on the storage threshold and the storage space information. In some embodiments, as depicted in FIG. 2, after operation 208, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
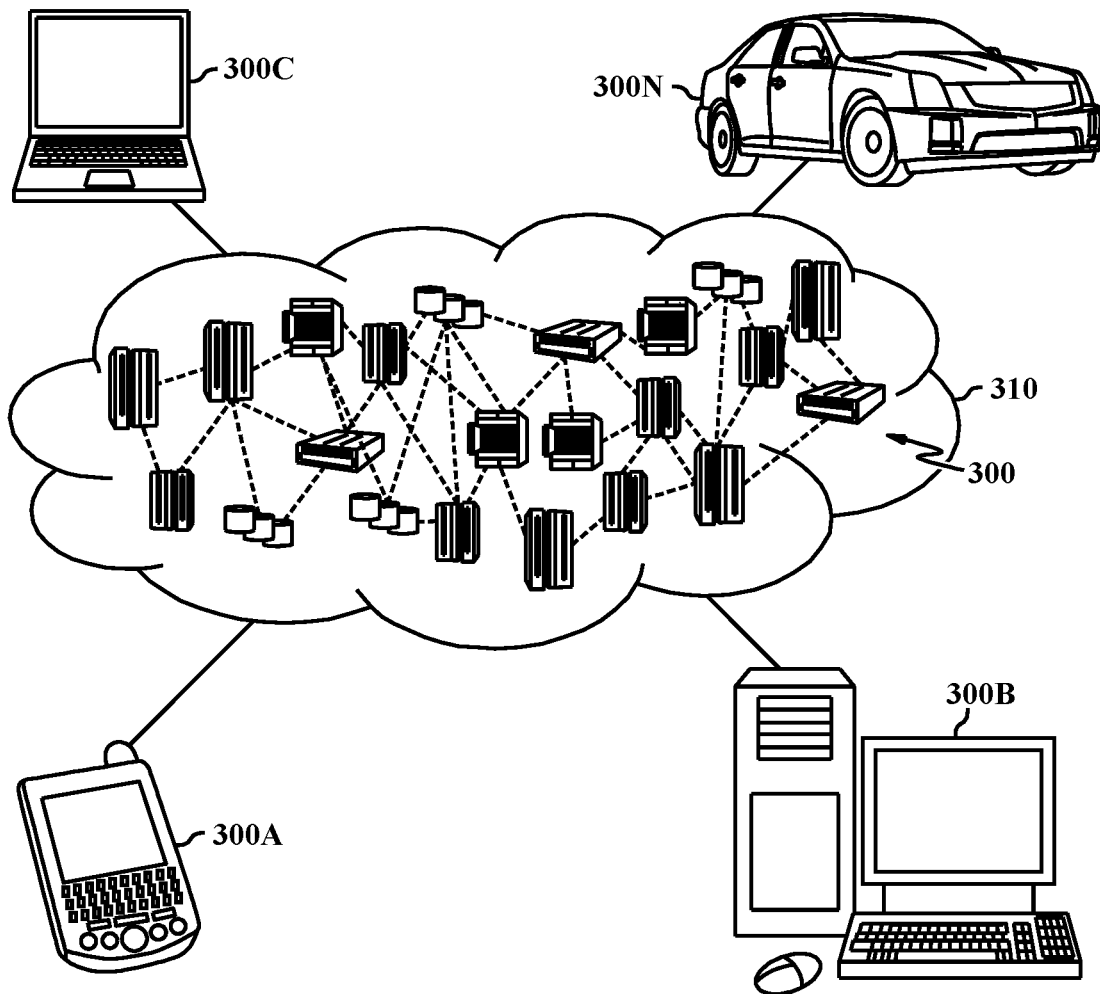
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
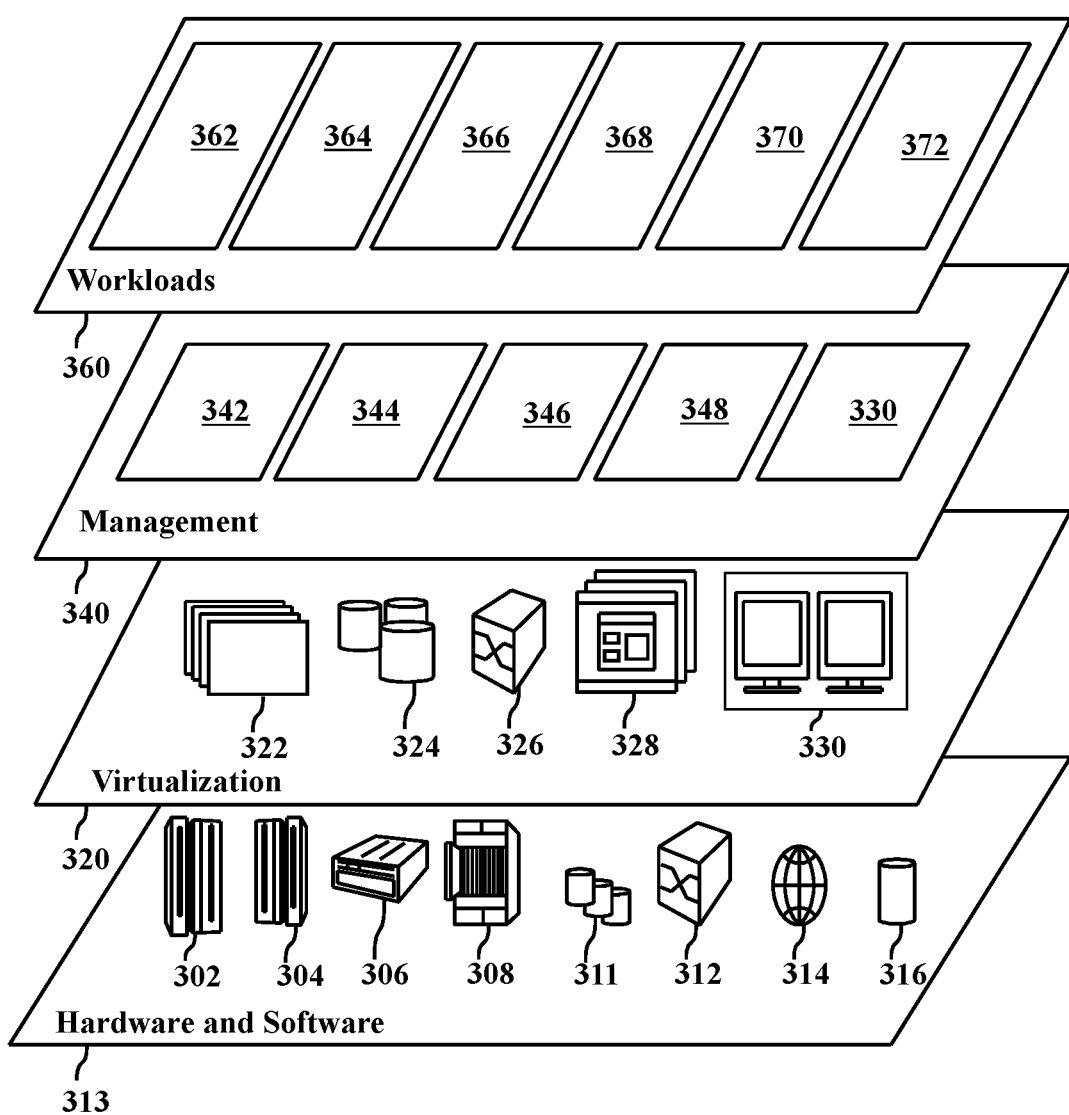
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and managing agile storage space 372.

Figure 4:
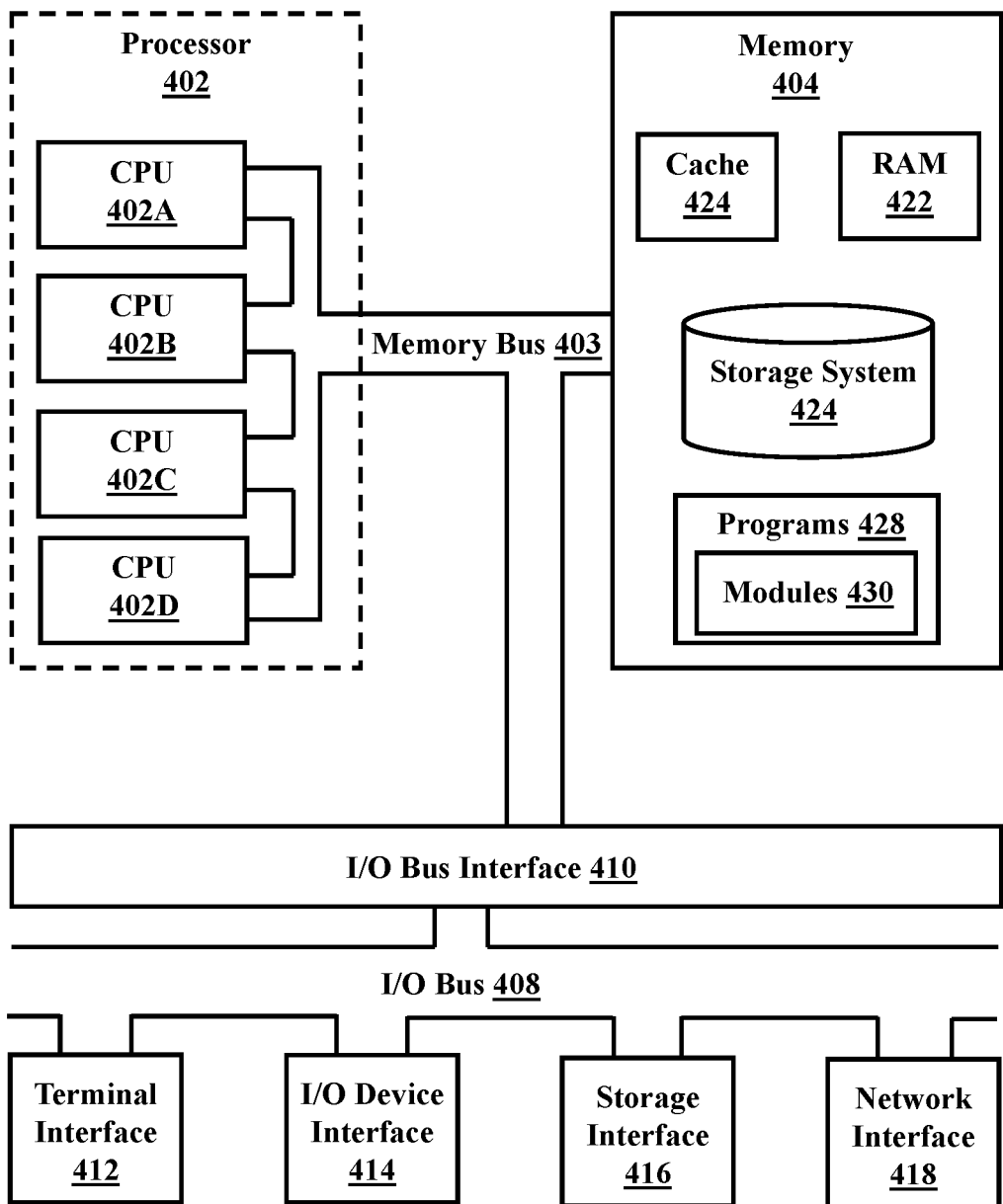
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of managing an agile storage space, the method comprising:
   receiving, by a processor, storage space information associated with the agile storage space, and information associated with one or more objects, wherein the agile storage space includes one or more smart storage spaces;
   analyzing the storage space information and the information associated with the one or more objects;
   generating a digital twin of the agile storage space and the one or more objects using the analyzed storage space information and the information associated with the one or more objects;
   producing one or more simulations associated with how the one or more objects may be stored in the agile storage space using the generated digital twin;
   determining if an amount of the one or more objects exceeds a storage threshold, wherein the amount of the one or more objects is based, at least in part, on the storage space information and the one or more simulations using the generated digital twin; and
   assigning the one or more objects to the one or more smart storage spaces based, at least in part, on the storage threshold, the storage space information, and the one or more simulations using the generated digital twin.

2. The method of claim 1, further comprising:
   determining the amount of the one or more objects does not exceed the storage threshold; and
   assigning the one or more objects to a primary storage space, wherein the primary storage space is one of the one or more smart storage spaces of the agile storage space.

3. The method of claim 1, further comprising:
   determining the amount of the one or more objects exceeds the storage threshold;
   identifying a secondary storage space based, at least in part, on the storage space information, wherein the secondary storage space is one of the one or more smart storage spaces of the agile storage space; and
   assigning the one or more objects to the secondary storage space.

4. The method of claim 3, wherein assigning the one or more objects to the secondary storage space, includes:

determining a capacity amount, wherein the capacity amount is a first subset of the one or more objects associated with the amount not exceeding the storage threshold;

determining an overload amount, wherein the overload amount is a second subset of the one or more objects associated with the amount exceeding the storage threshold;

assigning the capacity amount in a primary storage space; and assigning the overload amount to the secondary storage space.

5. The method of claim 1, further comprising:

analyzing the smart storage space for one or more environmental features, wherein the one or more environmental features are associated with the storage space information.

6. The method of claim 1, further comprising:

predicting the amount of the one or more objects associated with a particular user.

7. The method of claim 1, further comprising:

compiling a security policy associated with the one or more smart storage; and determining if one or more users are authorized users based, at least in part, on the security policy.

8. The method of claim 1, further comprising:

generating a cost associated with the one or more storage spaces, wherein the cost is based at least in part on the storage space information.

9. A system for managing an agile storage space, the system comprising:

a memory; and a processor in communication with the memory, the processor being configured to perform operations comprising:

receiving storage space information associated with the agile storage space, and information associated with one or more objects, wherein the agile storage space includes one or more smart storage spaces;

analyzing the storage space information and the information associated with the one or more objects;

generating a digital twin of the agile storage space and the one or more objects using the analyzed storage space information and the information associated with the one or more objects;

producing one or more simulations associated with how the one or more objects may be stored in the agile storage space using the generated digital twin;

determining if an amount of the one or more objects exceeds a storage threshold, wherein the amount of the one or more objects is based, at least in part, on the storage space information and the one or more simulations using the generated digital twin; and assigning the one or more objects to the one or more smart storage spaces based, at least in part, on the storage threshold, the storage space information, and the one or more simulations using the generated digital twin.

10. The system of claim 9, further comprising:

determining the amount of the one or more objects does not exceed the storage threshold; and assigning the one or more objects to a primary storage space, wherein the primary storage space is one of the one or more smart storage spaces of the agile storage space.

11. The system of claim 9, further comprising:

determining the amount of the one or more objects exceeds the storage threshold;

identifying a secondary storage space based, at least in part, on the storage space information, wherein the secondary storage space is one of the one or more smart storage spaces of the agile storage space; and assigning the one or more objects to the secondary storage space.

12. The system of claim 11, wherein assigning the one or more objects to the secondary storage space, includes:

determining a capacity amount, wherein the capacity amount is a first subset of the one or more objects associated with the amount not exceeding the storage threshold;

determining an overload amount, wherein the overload amount is a second subset of the one or more objects associated with the amount exceeding the storage threshold;

assigning the capacity amount in a primary storage space; and assigning the overload amount to the secondary storage space.

13. The system of claim 9, further comprising:

analyzing the smart storage space for one or more environmental features, wherein the one or more environmental features are associated with the storage space information.

14. The system of claim 9, further comprising:

predicting the amount of the one or more objects associated with a particular user.

15. The system of claim 9, further comprising:

compiling a security policy associated with the one or more smart storage; and determining if one or more users are authorized users based, at least in part, on the security policy.

16. The system of claim 9, further comprising:

generating a cost associated with the one or more storage spaces, wherein the cost is based at least in part on the storage space information.

17. A computer program product for managing an agile storage space, the computer program product comprising a computer readable storage medium having program instructions embodied therewith, the program instructions executable by a processor to cause the processors to perform a function, the function comprising:

receiving storage space information associated with the agile storage space, and information associated with one or more objects, wherein the agile storage space includes one or more smart storage spaces;

analyzing the storage space information and the information associated with the one or more objects;

generating a digital twin of the agile storage space and the one or more objects using the analyzed storage space information and the information associated with the one or more objects;

producing one or more simulations associated with how the one or more objects may be stored in the agile storage space using the generated digital twin;

determining if an amount of the one or more objects exceeds a storage threshold, wherein the amount of the one or more objects is based, at least in part, on the storage space information and the one or more simulations using the generated digital twin; and assigning the one or more objects to the one or more smart storage spaces based, at least in part, on the storage threshold, the storage space information, and the one or more simulations using the generated digital twin.

18. The computer program product of claim 17, further comprising:
   determining the amount of the one or more objects does not exceed the storage threshold; and
   assigning the one or more objects to a primary storage space, wherein the primary storage space is one of the one or more smart storage spaces of the agile storage space.

19. The computer program product of claim 17, further comprising:
   determining the amount of the one or more objects exceeds the storage threshold;
   identifying a secondary storage space based, at least in part, on the storage space information, wherein the secondary storage space is one of the one or more smart storage spaces of the agile storage space; and
   assigning the one or more objects to the secondary storage space.

20. The computer program product of claim 19, wherein assigning the one or more objects to the secondary storage space, includes:
   determining a capacity amount, wherein the capacity amount is a first subset of the one or more objects associated with the amount not exceeding the storage threshold;
   determining an overload amount, wherein the overload amount is a second subset of the one or more objects associated with the amount exceeding the storage threshold;
   assigning the capacity amount in a primary storage space; and
   assigning the overload amount to the secondary storage space.

* * * * *